United States Patent [19]
Rosen

[11] Patent Number: 5,911,929
[45] Date of Patent: Jun. 15, 1999

[54] METHOD AND AN APPARATUS FOR PRODUCING WEB-SHAPED PLASTIC FOIL

[75] Inventor: Ake Rosen, Helsingborg, Sweden

[73] Assignee: Tetra Laval Holdings & Finance S.A., Pully, Switzerland

[21] Appl. No.: 08/776,534

[22] PCT Filed: Jul. 17, 1995

[86] PCT No.: PCT/SE95/00865

§ 371 Date: Mar. 5, 1997

§ 102(e) Date: Mar. 5, 1997

[87] PCT Pub. No.: WO96/04120

PCT Pub. Date: Feb. 15, 1996

[30] Foreign Application Priority Data

Aug. 4, 1994 [SE] Sweden .................................. 9402629

[51] Int. Cl.[6] ............................. B29C 47/00; B29C 47/76
[52] U.S. Cl. .................. 264/102; 264/211; 264/211.12; 366/75; 366/85; 425/203; 425/204
[58] Field of Search .................................. 264/102, 211, 264/211.12; 425/203, 204; 366/75, 85

[56] References Cited

U.S. PATENT DOCUMENTS

| | | |
|---|---|---|
| 3,985,348 | 10/1976 | Skidmore . |
| 4,110,844 | 8/1978 | Nakamura . |
| 4,663,103 | 5/1987 | McCullough et al. .............. 264/102 X |

FOREIGN PATENT DOCUMENTS

| | | |
|---|---|---|
| 0 353 991 A2 | 2/1990 | European Pat. Off. . |
| 15 54 920 B2 | 5/1976 | Germany . |
| 19 49 489 B2 | 11/1977 | Germany . |
| 61-213121 | 9/1986 | Japan . |

*Primary Examiner*—Leo B. Tentoni
*Attorney, Agent, or Firm*—Burns, Doane, Swecker & Mathis, L.L.P.

[57] ABSTRACT

A method and an apparatus for producing web-shaped plastic foil (19) is described, in which granulate or pulverulent polymer and particulate finer are intermingled, whereafter the mixture is extruded through a die aperture (18) for forming the finished plastic foil. In order to facilitate the intermingling of the above-disclosed starting materials, the granulate or pulverulent polymer is plasticized and de-aired prior to the admixture of the particulate filler.

16 Claims, 1 Drawing Sheet

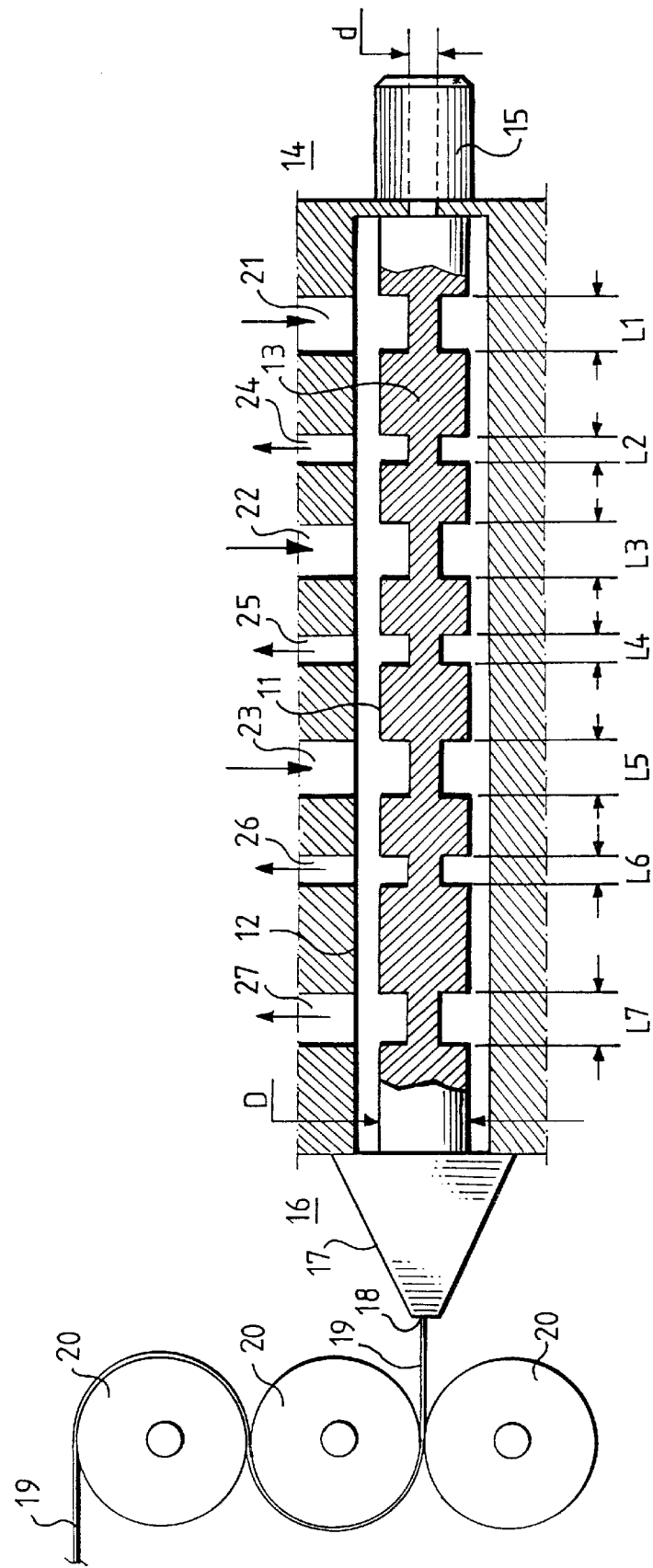

METHOD AND AN APPARATUS FOR PRODUCING WEB-SHAPED PLASTIC FOIL

TECHNICAL FIELD

The present invention relates to a method of producing web-shaped plastic foil in which granular or pulverulent polymer and particulate filler are intermingled and extruded through a flat gap die aperture. The present invention also relates to an apparatus for producing web-shaped plastic foil employing the method according to the present invention.

BACKGROUND ART

Web-shaped plastic foils of the type described above are previously known, for example, from EP-A-O 353 496 and EP-A-O 353 991. The prior art web-shaped plastic foils are produced from a particulate starting material of propylene homopolymer or ethylene-propylene copolymer and between 50 and 80 weight per cent filler, and are intended to be used as packaging materials for configurationally stable, liquid-tight food packages. Similar web-shaped plastic foils are also known from GB-A-1 554 143.

According to the above-described prior art technology, see for example GB-A-1 554 143, the web-shaped plastic foil is produced from particulate starting materials of polymer and filler, by an extrusion process comprising three mutually discrete process steps which each requires its own individual process equipment and which it has not hitherto been possible to integrate into a single continuous process cycle.

In the prior art extrusion process, a pulverulent polymer is fed, in a first process stage, together with such components as stabilisers, into a first extrusion plant which produces stabilised polymer granules by extrusion in a known manner. In a second process stage, the stabilised polymer granules are fed from the first process stage together with particulate filler into a second extrusion plant which produces stabilised polymer granules including filler, by extrusion in a known manner. The stabilised polymer granules containing filler from the second process stage are finally fed, in a third process stage, into a third extrusion plant which produces web-shaped plastic foil by extrusion of the polymer material through a flat gap die aperture. The extruded plastic foil is then calendered to the desired foil thickness with the aid of calender rollers disposed in association with the discharge end of the third extrusion plant.

OBJECTS OF THE INVENTION

It is obvious that the above-described prior art extrusion process for producing web-shaped plastic foil suffers from serious drawbacks, including high capital and investment costs for the process equipment, and one object of the present invention is therefore to propose an improved process by which these drawbacks may be obviated. One particular object of the present invention is to realise a method according to which web-shaped plastic foil may be produced from particulate starting materials of polymer and filler, in a process stage using a single extruder apparatus, as opposed to the process according to the above-described prior art technology which requires no less than three mutually discrete process stages with each respective extrusion plant. Yet a further object of the present invention is to realise an apparatus for producing web-shaped plastic foil employing the method of the present invention.

SUMMARY OF THE INVENTION

Particulate polymer which is employed as one of the starting materials in the method according to the present invention, together with other particulate starting materials including filler, contains relatively large volumes of air and other process gases which unavoidably accompany the starting material into the extruder apparatus and which, through the mechanical processing by the apparatus, or compression of the infed starting materials, tend to be released from the compressed material while excess pressure is built up, which counteracts continued mechanical processing of the plasticized polymer mass. This undesirable, but inevitable air volume increases and expands the smaller the particle size of the infed starting material particles. If extremely fine-particulate starting materials are employed, for example pulverulent polymer together with filler particles of a particle size of less than 30 μm, the extruder apparatus thus requires extremely high power input to be able to overcome the increased excess pressure inside the extruder apparatus. This entails in turn undesirable temperature increases which may seriously damage the temperature-sensitive polymer and thereby cause a deterioration in the properties of the extrudate.

The problem of accompanying air and process gases which are released during compression and mixing of the infed fine-particulate starting materials in the extruder apparatus is effectively solved according to the present invention in that the extruder apparatus is de-aired or evacuated at appropriately selected points in the direction of advancement of the extruder apparatus, at the same time as disruptions in the mechanical processing or compression of the infed starting materials are dealt with in association with such de-aeration or evacuation points.

As a result of these measures, which are characterizing features of the present invention, it is possible to employ extremely fine-particulate starting materials without consequentially exaggerated excess pressure and exaggerated temperature increases which are inevitably associated with the prior art technology. As a result of the above measures, it is further possible to reduce the method according to the present invention into practice in a single process stage employing but one extruder apparatus, which is a major improvement vis-à-vis the prior art technology which requires three discrete process stages and at least three separate extruder plants for producing the web-shaped plastic foil.

According to one particularly advantageous embodiment of the method according to the present invention, use is made of an extruder apparatus comprising two advancement screws which are rotated at the same speeds and in the same directions of rotation (so-called co-rotation), as opposed to the extruder plants which are employed in the prior art extrusion process as disclosed in the above-considered GB-A-1 554 143 which have two advancement screws driven in opposite directions of rotation. By means of the advancement screws rotating at the same speeds and in the same directions of rotation in the extruder apparatus according to the present invention, the through-flow capacity of the extruder apparatus, and thereby the production rate of the extrusion method according to the present invention can be greatly increased. While the counter-rotating advancement screws according to the prior art technology can be rotated at speeds of at most 100 rpm, the co-rotating advancement screws in the extruder apparatus according to the present invention can be rotated at such high speeds as up to 600 rpm.

BRIEF DESCRIPTION OF THE ACCOMPANYING DRAWING

The present invention will now be described in greater detail hereinbelow, with particular reference to the accompanying Drawing, which schematically illustrates a longitudinal section through an extruder apparatus of the twin-screw type for producing web-shaped plastic foil employing the method according to one preferred embodiment of the present invention.

DESCRIPTION OF PREFERRED EMBODIMENT

Referring to the Drawing, the extruder apparatus for producing web-shaped plastic foil employing the method according to the invention and illustrated schematically in longitudinal section, has been given the generic reference numeral 10. The extruder apparatus 10 is of the twin-screw type with two parallel advancement screws 11 centrally disposed in the longitudinal direction of the extruder apparatus, only one of the screws being shown on the Drawing. The advancement screws 11 are surrounded by a common, substantially cylindrical casing 12 and include their respective axial screw shafts 13 with helical blades or rings (not shown) which extend from the screw shafts 13 and terminate a short distance from the inner walls of the casing 12. The rotary screw shafts 13 are driven by drive means 15 disposed at the rear end of the extruder apparatus 10 (the right-hand end of the Drawing), for example an electric motor by means of which the advancement screws 11 may be rotated in the same directions of rotation, at speeds varying between 100 and 600 rpm.

At the forward end 16 (the left-hand end of the Drawing) of the extruder apparatus 10, there is provided a die head 17 which is connected to the casing 12 and which, at its forward end, has a flat gap shaped die aperture intimated at 18, through which a web-shaped plastic foil 19 is extruded. Downstream of the extruder apparatus 10 in connection with the die head 17, there are provided a number (three) of mutually vertically superjacent calender rollers 20 between which the extruded plastic foil 19 is led for calendering to the desired foil thickness, for example from 20 to 3000 μm.

As shown on the Drawing, the cylindrical casing 12 has a number (three) of inlets 21, 22, 23 which are disposed in mutual sequence in the direction of advancement of the advancement screws 11 (from right to left on the Drawing), and which are in communication with the interior of the extruder apparatus 10 between the advancement screws 11 and the inner walls of the casing 12. Of these inlets, the rear inlet 21 is intended for infeed of polymer, for example pulverulent propylene homopolymer or ethylene-propylenecopolymer and possessing a melt index according to ASTM of between 0.5 and 5 (230° C.; 2.16 kg). The interjacent inlet 22 and the forward inlet 23 are intended for the infeed of particulate filler and other particulate additives selected for the production process, such as stabilisers, pigment etc.

The particulate filler which is to be employed in the method according to the present invention may be any conventional filler whatever, such as chalk, talcum, mica etc. For the purpose of producing web-shaped plastic foil for packaging purposes, the filler is preferably fine-particulate chalk with a particle size of between 1 and 30 μm which is supplied through inlets 22 and 23 in such quantities that the filler constitutes between 50 and 80 per cent of the weight of the produced plastic foil.

It will further be apparent from the Drawing that the cylindrical casing 12 has a number of additional outlets 24, 25 and 26 which are disposed in mutual sequence after one another in the direction of advancement of the advancement screws 11 and which are in communication with the free space between the advancement screws 11 and the inner walls of the casing 12, these outlets being provided for the escape of air and other gases formed during the production process so as to avoid obstructive excess pressure within the extruder apparatus 10. More precisely, the rearmost of the outlets 24 is disposed in the region between the rear inlet 21 and the interjacent inlet 22. The interjacent outlet 25 is disposed in the region between the interjacent inlet 22 and the forward inlet 23, while the forward outlet 26 is disposed in the region ahead of the forward inlet 23.

The cylindrical casing 12 is moreover provided with a fourth outlet 27 in a region proximal to the die head 17 for the escape of additional air and process gases before the extrudable plastic mass is extruded through the flat gap die head aperture at reference numeral 18.

The screw shafts 13 are of a cross sectional diameter (D) which is constant throughout their entire length, apart from in certain length sections L1–L7 within which the screw shafts 13 are of reduced cross sectional diameter (d), whereby enlarged free spaces between the screw shafts 13 and the inner walls of the casing 12 are formed within the regions of the above-mentioned length sections L1–L7.

Each respective length section L1–L7 is located in connection to its respective inlets 21–23 and outlets 24–26 in such a manner that the inlet 21 coincides with the length section L1, the outlet 24 coincides with length section L2, inlet 22 coincides with length section L3, outlet 25 coincides with length section L4, inlet 23 coincides with length section L5, outlet 26 coincides with length section L6 and outlet 27 coincides with length section L7.

Thus, as a result of the enlarged free spaces, increased space is created for the infed material in the extruder apparatus 10, whereby the tendency to excess pressure is reduced within these enlarged spaces, at the same time as the infeed of material through the inlets 21, 22 23 is facilitated and the risk of undesirable material escape through the outlets 24, 25, 26 and 27 as a result of inner excess pressure is reduced or entirely eliminated.

In the above-described extruder apparatus 10, the advancement screws 11 are to have a length which may vary from 35×D to 50×D, where D designates the non-reduced diameter of the screw shafts in accordance with the above definition. A preferred screw length is 44×D.

In the production of web-shaped plastic foil 19 employing the above-described extruder apparatus 10, the procedure is as follows according to one preferred embodiment of the method of the present invention.

Using the drive means 15, both of the advancement screws 11 are rotated in mutually the same directions of rotation and at mutually the same speeds which may vary within the range of between 100 and 600 rpm. Polymer, for example pulverulent propylene homopolymer or ethylene/propylene copolymer of a melt index according to ASTM of between 0.5 and 5 (230° C.; 2.16 kg) is fed into the extruder apparatus 10 through the inlet 21 and is advanced by the rotating advancement screws 11 through the throttled space between the advancement screws 11 and the inner walls of the casing 12 in the region between the length sections L1 and L2 during beginning plasticization as a result of the mechanical processing or compression of the pulverulent polymer by the advancement screws.

At the outlet 24 between the length sections L1 and L2, the compressed polymer mass is de-aired or evacuated, at the same time as compression is temporarily discontinued because of the enlarged inner space in the evacuation area of the outlet 24.

From the enlarged inner evacuation space, the de-aired polymer mass is advanced through the throttled passage between length sections L2 and L3 under additional plasticization as a result of the mechanical effect of the co-rotating advancement screws 11 on the polymer mass.

Fine-particulate filler, for example chalk, mica, talcum etc., of a particle size of between 1 and 30 µm is fed in through the inlet 22 together with other selected fine-particulate additives, such as stabilisers, pigment etc., at the same time as the pressure within the extruder apparatus 10 is temporarily reduced as a result of the enlarged inner space in the region of the inlet 22.

From the enlarged inlet region, the polymer mass and added filler and additive particles are advanced through the throttled passage between the length sections L3 and L4 where the filler and additive particles are mixed into the plasticized polymer mass as a result of the mechanical processing of the polymer mass by the advancement screws 11.

At the outlet 25, the mixture of plasticized polymer mass and particles is de-aired, at the same time as the pressure within the extruder apparatus 10 is temporarily reduced as a result of the enlarged inner space in the region of length section L4 in order to avoid undesirable material escape through the outlet 25 as a result of inner excess pressure.

From the outlet region at 25, the evacuated or de-aired mass of polymer and particles is advanced through the throttled passage between length sections L4 and L5 where further admixture of particles in the plasticized polymer mass takes place.

Through the inlet 23, further fine-particulate filler such as chalk, mica, talcum etc., of a particle size of between 1 and 30 µm is added together with other selected fine-particulate additives such as stabilisers, pigments etc., at the same time as the pressure within the extruder apparatus 10 is temporarily reduced as a result of the enlarged inner space because of the reduced diameter of the screw shaft within length section L5, so as to facilitate the addition infeed of particles.

From the inlet region at 23, the polymer mass and particles are advanced through the throttled passage between length sections L5 and L6, where the infed particulate material is intermingled into the polymer mass as a result of the mechanical processing by the advancement screws 11.

At the outlet 26, the mixture of plasticized polymer mass and particles is de-aired, at the same time as the pressure within the extruder apparatus 10 is temporarily reduced as a result of the reduced diameter of the screw shafts within length section L6 in order to avoid undesirable material escape through the outlet 26 as a result of inner excess pressure.

From the outlet region at 26, the de-aired plasticized mass of polymer and particles is advanced through the throttled passage between the length sections L6 and L7 where additional admixture of particles takes place as a result of the mechanical processing of the polymer mass by the advancement screws 11.

At the outlet 27, the plasticized mass of polymer and particles is de-aired once again, at the same time as the pressure within the extruder apparatus 10 is temporarily reduced as a result of the reduced core diameter of the screw shafts 13 within the region of the length section L7 in order to avoid undesirable material escape through the outlet 27 as a result of inner excess pressure.

From the outlet region at 27, the de-aired mass of polymer and particles is advanced through the throttled passage between the length section L7 and the die head 17 where final admixture of particles in the polymer mass takes place.

The thus homogeneous, extrudable polymer mass is pressed into the die head 17 and is extruded through the flat gap aperture 18 at the forward end of the die head 17 for the formation of a web-shaped plastic foil 19. The extruded web-shaped plastic foil 19 is thereafter led first through the nip between the two lower calender rollers 20 and thereafter through the nip between the two upper calender rollers 20 for calendering to the desired foil thickness, which may vary between 20 µm and 3000 µm, depending upon the intended fields of application of the plastic foil 19.

In the above-described method according to the present invention, it is possible to produce web-shaped plastic foil at such a high production rate as approximately 20 tonnes of plastic foil per hour. Using the method according to the present invention, which is reduced into practice in one single process stage employing only one extruder apparatus, there will further be achieved improved foil properties as compared with a plastic foil which is produced in accordance with the previously described prior art technology which employs three separate extruder plants. For example, the loss of stabiliser and polymer is slight in the method according to the present invention as compared with the prior art method, which is a major advantage in the event the extruded plastic foil is to be employed as a packaging material for food packages, since problems relating to flavour (so-called off-taste) are thereby substantially reduced.

It should finally be pointed out that the present invention is not, naturally, restricted solely to the above-describe embodiment which is merely intended to illustrate and illuminate the present invention, and its concepts. Hence, modifications and alterations are conceivable without departing from the inventive concept as herein disclosed and defined in the appended Claims.

What is claimed is:

1. A method of producing a web-shaped plastic foil, comprising the steps:

plasticizing granulate or pulverulent polymer;

evacuating said granulate or pulverulent polymer to remove gases therefrom;

intermingling said evacuated polymer with a particulate filler to form an admixture;

extruding said admixture through a flat gap die aperture to form said foil;

wherein said intermingling step is performed on two separate occasions. said evacuating step being also performed between said two separate occasions.

2. The method as claimed in claim 1, wherein said intermingling step further comprises intermingling said evacuated polymer with particulate additives selected from the group consisting of stabilizers, pigments, and combinations thereof.

3. The method as claimed in claim 1, wherein said two separate occasions comprise a last occasion, and further comprising evacuating said polymer mass at least one more time after said last occasion.

4. A method of producing a web-shaped plastic foil, comprising the steps:

plasticizing granulate or pulverulent polymer;

evacuating said granulate or pulverulent polymer to remove gases therefrom;

intermingling said evacuated polymer with a particulate filler to form an admixture;

extruding said admixture through a flat gap die aperture to form said foil;

wherein said plasticizing step and said intermingling step are performed with an extruder apparatus comprising one inlet for the polymer, inlets for the filler, and evacuation outlets for said evacuation step.

5. The method as claimed in claim 1, wherein said evacuating step is performed under pressure-reduction of said plasticized polymer, and the polymer mass containing filler, respectively.

6. The method as claimed in claim 1, wherein the addition of the particulate filler and other additives also takes place under pressure-reduction of the plasticized polymer, and polymer mass containing filler, respectively.

7. The method as claimed in claim 1, wherein the granulate or pulverulent polymer consists of a propylene homopolymer or an ethylene/propylene copolymer of a melt index between about 0.5 and about 5 at 230° C. and 2.16 kg.

8. The method as claimed in claim 1, wherein the particulate filler is added in an amount of between 50 and 80 per cent of the weight of the polymer.

9. The method as claimed in claim 1, wherein the particulate filler is of a particle size which varies between 1 and 30 $\mu$m.

10. The method as claimed in claim 1, wherein the extruded, web-shaped plastic foil (19) is calendered to a foil thickness of between 20 and 3000 $\mu$m.

11. The method as claimed in claim 1, wherein the granulate or pulverulent polymer is plasticized by mechanical compression.

12. The method as claimed in claim 2, wherein the particulate filler and said additives are admixed into the plasticized polymer by mechanical processing.

13. An extruder apparatus useful for the production of a web-shaped plastic foil comprising:

a substantially cylindrical, elongate casing having an inlet for granulate or pulverulent polymer, inlets for particulate filler and other particulate additives, and evacuation outlets for the removal of air and other prevalent process gases; and two screw devices centrally disposed within said casing (12), said screw devices being rotatable at the same speed and in the same directions of rotation.

14. The extruder apparatus as claimed in claim 13, wherein each respective screw device includes a screw shaft with helical blades or vanes which extend from the screw shaft and terminate adjacent to the inner walls of the casing; and said screw shafts include length sections of reduced cross sectional diameter in the regions of said inlets and said outlets, for the formation of enlarged free inner spaces within said inlet and outlet regions.

15. The extruder apparatus as claimed in claim 13, wherein said screw shafts are of a length from about 35×D to about 50×D, where D designates the diameter of the screw shafts in the regions between the diameter-reduced length sections.

16. The extruder apparatus as claimed in claim 13, characterized in that the evacuation outlet is disposed between the inlet for the granulate or pulverulent polymer and the inlets for the particulate filler and said additives; that the evacuation outlet is disposed between the inlets for the particulate filler and said additives; and that the evacuation outlet is disposed after the last inlet for the particulate filler and said additives, seen in the direction of advancement of the screw devices towards a die head which is disposed at the forward end of the extruder apparatus and which has a flat gap die aperture through which the polymer mass containing filler is intended to be extruded for the formation of the web-shaped plastic foil.

* * * * *